United States Patent [19]

Shackle et al.

[11] Patent Number: 5,436,091
[45] Date of Patent: Jul. 25, 1995

[54] SOLID STATE ELECTROCHEMICAL CELL HAVING MICROROUGHENED CURRENT COLLECTOR

[75] Inventors: Dale R. Shackle, Springboro; Denis G. Fauteux, Centerville, both of Ohio

[73] Assignee: Valence Technology, Inc., San Jose, Calif.

[21] Appl. No.: 155,547

[22] Filed: Nov. 22, 1993

Related U.S. Application Data

[63] Continuation of Ser. No. 902,526, Jun. 22, 1992, abandoned, which is a continuation of Ser. No. 620,458, Nov. 30, 1990, abandoned, which is a continuation of Ser. No. 350,874, May 11, 1989, abandoned.

[51] Int. Cl.$^6$ ............................................. H01M 6/18
[52] U.S. Cl. .................................... 429/192; 429/212; 429/218; 429/245
[58] Field of Search ............... 429/191, 192, 198, 212, 429/218, 213, 217, 245

[56] References Cited

U.S. PATENT DOCUMENTS

| | | |
|---|---|---|
| 3,393,098 | 7/1968 | Hartner et al. |
| 3,400,119 | 9/1968 | LeDuc ............................ 429/44 |

(List continued on next page.)

FOREIGN PATENT DOCUMENTS

| | | |
|---|---|---|
| 894407 | 2/1972 | Canada . |
| 0266861 | 5/1988 | European Pat. Off. . |
| 0385802 | 9/1990 | European Pat. Off. . |
| 0396324 | 11/1990 | European Pat. Off. . |
| 1324107 | 3/1963 | France . |
| 1408215 | 7/1965 | France . |
| 1417112 | 10/1965 | France . |
| 2457569 | 12/1980 | France . |
| 156501 | 7/1982 | German Dem. Rep. . |
| 3829541 | 3/1989 | Germany . |
| 62-160656 | 1/1986 | Japan . |
| 61-34865 | 2/1986 | Japan . |
| 61-260554 | 11/1986 | Japan . |
| 63-310574 | 12/1988 | Japan . |
| 1154521 | 6/1969 | United Kingdom . |
| 1154522 | 6/1969 | United Kingdom . |
| 2158987 | 11/1985 | United Kingdom . |

OTHER PUBLICATIONS

Gould, R., ed. *Fuel Cell Systems II, Advances In Chemistry Series,* © 1969 ACS, pp. 394–401.

N.T.I.S. Technical Notes, No. 2, part C, Feb. 1986, Springfield, Va., US; "Methanol fuel cell".

Chemical Abstracts, vol. 104, No. 24, 16th Jun. 1986, p. 163, abstract No. 210058s, Columbus, Ohio, US; & JP-A-61 34 865 (Hitachi, Ltd) 19 Feb. 1986.

Chemical Abstracts, vol. 110, No. 13, 26th Jun. 1989, p. 186, abstract No. 234664m, Columbus, Ohio, US; & JP-A 63 310 574 (Tokyo Gas Co., Ltd. et al.) 19 Dec. 1988.

Patent Abstracts of Japan, vol. 11, No. 113, (E-497) [2560], 9 Apr. 1987; & JP-A-61 260 554 (Hitachi Ltd.) 18 Nov. 1986.

*Primary Examiner*—Anthony Skapars
*Attorney, Agent, or Firm*—Robert E. Krebs

[57] ABSTRACT

A solid state laminar electrochemical cell comprising:
an alkali metal anode layer;
a solid ionically conductive electrolyte layer;
a cathode composition layer; and
a current collector;
wherein said electrolyte layer is interposed between said alkali metal anode layer and said cathode layer and said cathode layer is interposed between said electrolyte layer and said current collector, the surface of said current collector which contacts said electrolyte layer being microroughened to enable the cathode layer to tightly adhere to said current collector is disclosed.

8 Claims, 2 Drawing Sheets

U.S. PATENT DOCUMENTS

| | | | |
|---|---|---|---|
| 3,438,815 | 4/1969 | Giner | 429/44 |
| 3,619,296 | 11/1971 | Niedrach et al. | 429/42 |
| 3,956,191 | 5/1976 | Casomano | 502/330 |
| 4,125,565 | 11/1978 | Antos | 502/326 |
| 4,186,110 | 1/1980 | Jalan et al. | 502/185 |
| 4,202,934 | 5/1980 | Jalan | 502/185 |
| 4,214,970 | 7/1980 | Spaziante et al. | 502/326 |
| 4,303,748 | 12/1981 | Armand et al. | 429/192 |
| 4,416,915 | 11/1983 | Palmer et al. | 427/126.3 |
| 4,492,021 | 1/1985 | Wright | 429/104 X |
| 4,522,894 | 6/1985 | Itwang et al. | 429/17 |
| 4,547,440 | 10/1985 | Hooper et al. | 429/192 X |
| 4,560,632 | 12/1985 | Alberto | 429/196 |
| 4,589,197 | 5/1986 | North | 429/192 X |
| 4,689,475 | 8/1987 | Kleiner et al. | 219/553 |
| 4,701,434 | 10/1987 | Köll | 502/326 |
| 4,702,973 | 10/1987 | Marianowski | 429/41 |
| 4,735,875 | 4/1988 | Anderman et al. | 429/194 |
| 4,751,157 | 6/1988 | Uchiyama et al. | 429/194 |
| 4,751,158 | 6/1988 | Uchiyama et al. | 429/194 |
| 4,792,504 | 12/1988 | Schwab et al. | 429/192 |
| 4,794,054 | 12/1988 | Ito et al. | 502/326 |
| 4,802,958 | 2/1989 | Mazanec et al. | 429/40 |
| 4,830,939 | 5/1989 | Lee et al. | 429/192 |
| 4,948,685 | 8/1990 | Ohsawa et al. | 429/213 |
| 5,037,712 | 8/1991 | Shackle et al. | 429/192 |

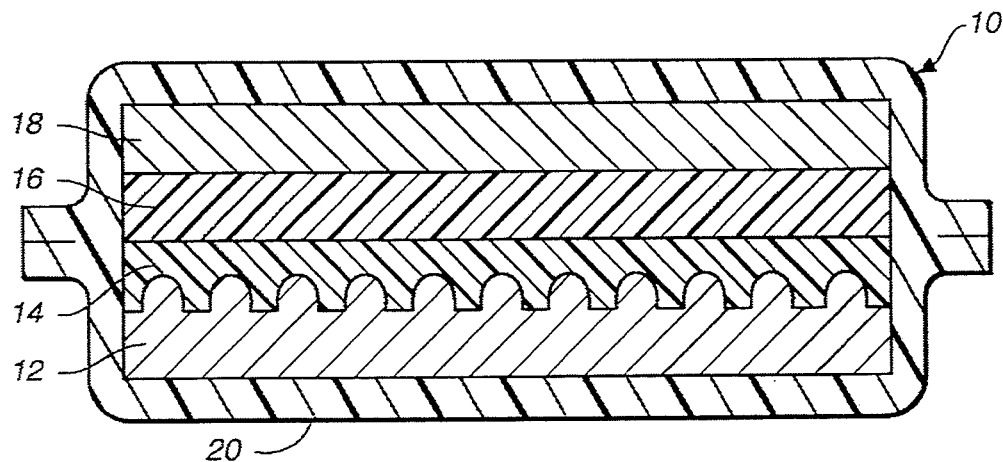
FIG._1
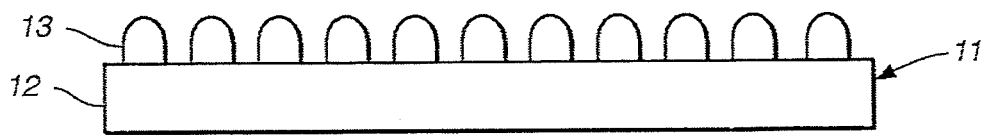
FIG._2
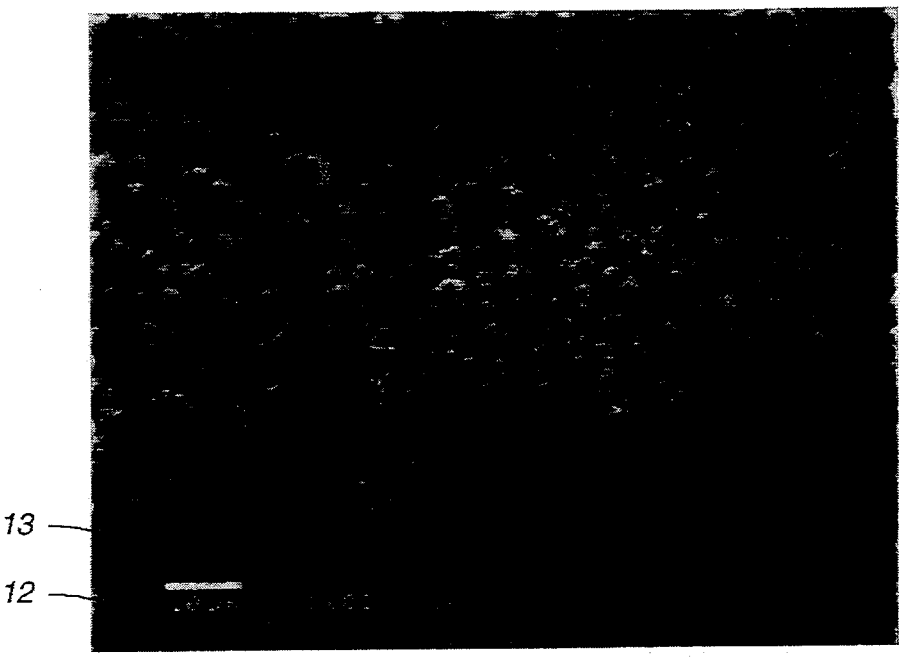
FIG._3

FIG._4
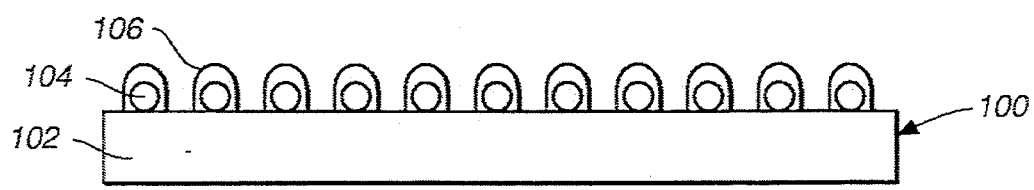
FIG._5
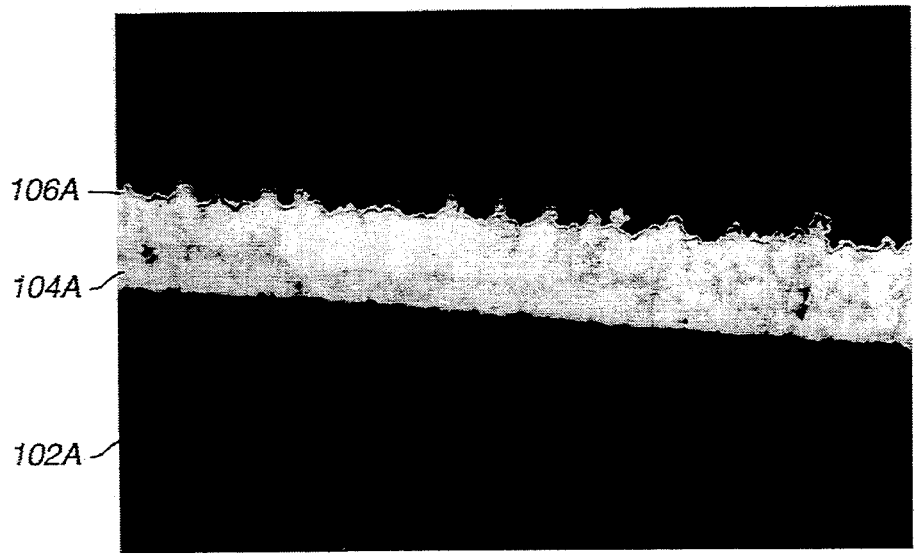
FIG._6

SOLID STATE ELECTROCHEMICAL CELL HAVING MICROROUGHENED CURRENT COLLECTOR

This application is a continuation, of application Ser. No. 07/902,526, filed Jun. 22, 1992, now abandoned, which is a continuation, of application Ser. No. 07/620,458, filed Nov. 30,1990, which is a continuation of application Ser. No. 07/350,874, filed May 11, 1989 (both now abandoned).

BACKGROUND OF THE INVENTION

1. Field of the Invention

The present invention relates to the manufacture of a solid state electrochemical cell, and more particularly, a solid state cell having a lithium anode, electrolyte, cathode and current collector, wherein the adhesion of the cathode to the current collector is improved by microroughening the surface of the current collector which contacts the cathode.

2. Description of the Prior Art

Solid state electrochemical devices are the subject of intense investigation and development. They are described extensively in the patent literature. See, for example, U.S. Pat. Nos. 4,303,748 to Armand; 4,589,197 to North; 4,547,440 to Hooper et al.; and 4,228,226 to Christiansen. These cells are typically constructed of an alkali metal foil anode, typically a lithium foil, an ionically conducting polymeric electrolyte, a finely divided transition metal oxide cathode, and a cathode current collector which is attached to the face of the cathode not contacting the electrolyte. The current collector usually employed is a sheet of metal foil such as aluminum, nickel, or stainless steel.

Although the above described cells have presented a viable option to older, more traditional secondary type discharge cells, the rechargeability and impedance of the cells have not achieved optimal performance. Part of the problem lies in the failure of the cathode material to form a good electric contact with the current collector. Failure of the cathode material making a good electrical contact with the current collector leads to an overall increase in cell impedance. This in turn, makes it difficult to recharge the cell.

In theory, optimal performance occurs if the cathode material is in intimate contact with the cathode current collector, and wherein the cathode current collector has a high surface area to enable uniform contact between the cathode material and the collector. Attempts have been made in the art to increase both the adherence of the cathode material to the current collector, and to increase the surface area of the current collector. However, no such attempts have been made in the field of solid state alkali metal anode cells.

For example, U.S. Pat. Nos. 4,751,157 and 4,751,158 to Uchiyama et al. disclose cathode materials for use in lithium electrochemical cells. The cathode material comprises a mixed metal oxide as an active material, along with a conductive diluent and a binder which is pressed into electrodes on a nickel screen and sintered under vacuum. The cathode materials are used in cells which contain a liquid electrolyte, and more particularly, those which contain $LiAsF_6$ in an aprotic solvent, such as methyl formate.

U.S. Pat. No. 4,416,915 to Palmer et al. discloses a chalcogenide cathode made by applying a slurry of a mixture containing at least one intercalatable layered transition metal chalcogenide cathode active material, a conductivity enhancing agent and a binding agent in a vehicle to a high porosity current collector substrate, for example, foamed metals and glasses which are 97% to 90% porous with 10 to 1000 pores per square inch and adhering the cathode material to the substrate. The cathode material is utilized in a non-aqueous lithium cell having an electrolyte comprising an electrolyte-solvent mixture.

U.S. Pat. No. 4,560,632 to Alberto discloses a molded porous cathode collector for use in non-aqueous cells. the collector includes a particulate carbonaceous conductive material bonded with a suitable binder, and having on its surface a coating of a vinyl polymer film to improve its mechanical strength and handling characteristics. The cathode collector is used in association with liquid cathode materials.

U.S. Pat. No. 4,689,475 to Kleiner et al. discloses electrical devices which include two electrodes and a conductive polymer element located between the two electrodes. One of the electrodes is a metal electrode whose surface which contacts the conductive polymer is roughened or otherwise treated to improve its adhesion to the conductive polymer. The conductive polymers exhibit positive temperature coefficient behavior so that the electrical device can be used in heaters and circuit protection devices.

In the field of solid state lithium cells, U.S. Pat. No. 4,735,875 to Anderman et al. discloses a cell wherein a cathode material which takes the form of a microporous sheet containing polyethylene, an electrically conductive and electrochemically active particulate material and a plasticizer is laminated to a current collector such as a screen, grid, expanded metal, woven or non-woven fabric formed from efficient electron conductive materials such as carbon, or metal such as copper, aluminum, nickel, steel, lead or iron.

Accordingly, there exists a need in the art for a solid state alkali metal cell wherein a highly uniform electrical contact between the cathode material and cathode current collector is maintained during operation and recharging of the cell.

SUMMARY OF THE INVENTION

In accordance with the present invention, a solid state alkali metal anode primary or secondary cell having significant improvements in cell impedance and, in turn, rechargeability and high current discharge (power) is provided. The cell is particularly characterized by the maintenance of a tightly adherent contact between the cathode and cathode current collector of the cell.

In accordance with one embodiment, the invention comprises a solid state laminar electrochemical cell comprising:
 an alkali metal anode layer;
 a solid ionically conductive electrolyte layer;
 a cathode composition layer; and
 a current collector;
 wherein said electrolyte layer is interposed between said alkali metal anode layer and said cathode layer and said cathode layer is interposed between said electrolyte layer and said current collector, the surface of said current collector which contacts said electrolyte layer being microroughened to enable the cathode layer to tightly adhere to said current collector.

In a particular embodiment, the alkali metal anode layer comprises a lithium foil, a lithium coated metal foil or a lithium alloy. The preferred electrolyte is a single-phase solid solution of an ionizable alkali metal salt, a solvent for the salt, and a polymer which has been polymerized by exposure to actinic radiation. The cathode composition preferably includes $V_6O_{13}$, electrically-conductive carbon particles and the above-described ionically-conductive electrolyte.

The current collector is electrically conductive and is characterized by its surface which contacts the cathode being microroughened to enable better adherence of the cathode to the current collector. The microroughening of the surface can be accomplished by a number of methods. For example, the current collector can take the form of a metal foil substrate having the same or different metal particles electrodeposited onto its upper surface. The external surfaces of the metal particles form the microroughened surface. Alternatively, the current collector can take the form of a polymeric film having an electrically conductive material coated on its upper surface. The electrically conductive material, which takes the form of a metal or an electroconductive ink is discontinuously coated onto the film. The surface discontinituities form the microroughened surface. The improved adherence of the cathode composition to the current collector reduces the impedance of the overall cell, thereby improving performance, particularly during recharging.

In accordance with another embodiment of the present invention, a current collector for contacting the cathode layer of a solid state electrochemical laminar cell is provided. The collector comprises a metal foil, the surface of the metal foil which is to contact the cathode layer being microroughened.

In practice, the foil is preferably a nickel or copper foil and microroughening is accomplished by electrodepositing metal particles, typically nickel particles onto the metal foil.

In still another embodiment, a current collector for contacting the cathode layer of a solid state electrochemical laminar cell is provided. The collector comprises a polymeric substrate having an electrically conductive material deposited on the surface of the substrate which is to contact the cathode layer. The substrate preferably comprises a polyethylene terephthalate film and the material typically comprises one or more electrodeposited metals or an electroconductive ink. For example, the current collector can take the form of a plastic film having a first layer of a vapor deposited copper film and a second layer of electrodeposited nickel particles, overcoating the first copper layer. The chief advantage of this collector is that it can be manufactured with a minimal thickness.

Accordingly, it is an object of the present invention to provide a solid state electrochemical cell having an overall low impedance and improved rechargability.

A further object of the present invention is to provide a current collector for use in a solid state electrochemical laminar cell which is designed to have improved adherence to a cathode composition.

These, as well as other objects will become readily apparent to those skilled in the art as reference is made to the following drawings and detailed description of the preferred embodiment.

BRIEF DESCRIPTION OF THE DRAWINGS

FIG. 1 is a side cut-away view of a cell embodying the teachings of the instant invention.

FIG. 2 is a side view of a current collector embodying the teachings of the instant invention.

FIG. 3 is an electron microscope photograph top view of a nickel foil having electrodeposited thereon nickel particles.

FIG. 4 is an electron microscope photograph side view of a copper foil having electrodeposited thereon an irregular layer of nickel.

FIG. 5 is a side view of an alternate current collector embodying the teachings of the instant invention.

FIG. 6 is an electron microscope photograph side view of a polyethylene terephthalate film overcoated with a vapor deposited layer of copper which is overcoated with an electrochemically deposited layer of nickel.

DETAILED DESCRIPTION OF THE PREFERRED EMBODIMENT

While describing the preferred embodiment, certain terminology will be utilized for the sake of clarity. It is intended that such terminology include not only the recited embodiment, but all technical equivalents which perform substantially the same function, in substantially the same way to achieve substantially the same result.

A laminar solid state cell produced in accordance with one embodiment of the present invention is shown in FIG. 1 and is represented by element 10. Cell 10 includes current collector layer 12, cathode composition layer 14, electrolyte composition layer 16 and alkali metal anode layer 18. Cell 10 also includes protective covering 20 which functions to prevent water and air from contacting the reactive layers of the cell.

Cell 10 is preferably a laminar thin cell type including a lithium anode. Laminar thin-cell batteries containing lithium anodes are known in the art, and it will be appreciated that the cell can include various constructions such as bi-faced or bi-polar cell designs. Examples of cell constructions include a "jelly roll" or a fan folded laminate strip design, both of which are illustrated in U.S. Pat. No. 4,879,190 to Lundsgaard, which is hereby incorporated by reference.

Referring now to FIG. 2, the current collector, designated by element 11 is shown in greater detail. Collector 11 includes substrate 12, preferably a metal foil having a microroughened surface 13. Presence of microroughened surface 13 enables better adherence of the cathode composition to the current collector.

Substrate 12 may be selected from any number of electrically conductive materials, typically metals. Examples of substrate materials include carbon, copper, aluminum, nickel, steel, lead and iron and combinations thereof. In practice, the thickness of substrate 12 typically ranges from about 5 microns to about 25 microns and should be as thin as practicable.

The microroughened surface 13 can be prepared in a number of different ways. The preferred method is electrodeposition of metal particles, preferably copper or nickel particles onto substrate 12, the microroughened surface being the surface which is exposed to the cathode composition. For example, electrodeposited foils, particularly copper and nickel foils, are preferred for use in this invention. It is also possible to use other processes which result in a similar degree of roughness, e.g., irregularities which protrude from the surface by a distance of at least 0.03 microns, preferably at least 0.1 microns, particularly 0.1 to 100 microns, and which have at least one dimension parallel to the surface which is at most 500 microns, preferably at most 100 microns, particularly at most 10 microns, and which is preferably at least 0.03 micron, particularly at least 0.1 micron. The irregularities can be of the same shape as those produced by electrodeposition, e.g., generally spherical nodules protruding from the surface, or they can be of a different shape. Such processes can create the microrough surface by removal of material from a smooth surface, e.g., by etching, by chemical reaction with a smooth surface, e.g., by galvanic deposition, or by deposition of a microrough layer of the same or a different material on a smooth surface. A smooth foil can be treated by contact e.g. rolling or pressing with a patterned surface to generate a microroughness. The microrough surface can if desired be treated to change its chemical characteristics. For example, an electrodeposited metal foil can be passivated i.e. rendered inactive or less chemically reactive, by an appropriate treatment, e.g., one which provides a coating thereon of a water-stable oxide, especially a zinc-nickel or nickel treatment of an electrodeposited copper foil.

Referring to FIG. 3, an electron microscope top view of a nickel foil 12 with nickel particles 13 electrodeposited thereon is shown. The surface characteristics of the electrodeposited particles 13 provide the microroughened surface to enable better adhesion to the cathode composition.

Referring to FIG. 4, an electron microscope side view of an alternative metal coated metal foil current collector is shown. The collector 11A comprises a copper foil 12A overcoated with a discontinuous layer of nickel metal 13A. The surface of the nickel metal 13A is discontinuous to provide better adhesion to the cathode composition.

Referring back to FIG. 1, alkali metal anode layer 18 may take the form of a lithium foil, a lithium coated foil such as nickel or copper foil having a layer of lithium deposited on its surface or a lithium alloy. Lithium is a preferred anode material because it is very electropositive and light in weight. However, other alkali metal materials, such as sodium, may be practiced within the scope of the present invention.

Electrolyte layer 16, which is ionically but not electrically conductive, takes the form of a solid material and is laminated to the alkali metal anode layer 18 and the cathode layer 14.

The preferred electrolytes are solutions of an ionizable alkali metal salt or an alkaline earth salt, an aprotic solvent and a polymerizable compound. Still more preferred are solutions of an alkali metal salt, a liquid, monomeric or prepolymeric radiation or thermally polymerizable compound and a radiation or thermally inert ionically conducting liquid.

Polymerizable compounds useful in the electrolyte composition may yield either a conductive or nonconductive polymer. Compounds which yield a conductive polymer contain a heteroatom capable of forming donor-acceptor bonds with the alkali metal cation. Useful polymerizable compounds are described next.

Polyethylenically unsaturated monomeric or prepolymonomeric materials useful in the present invention are preferably compounds having at least one, and more preferably a plurality, of heteroatoms (particularly oxygen and/or nitrogen atoms) capable of forming donor acceptor bonds with an alkali metal cation and are terminated by polymerizable moieties. These compounds yield a conductive supportive matrix. More specifically they are preferably low molecular weight oligomers of the formulae (I)-(III) below

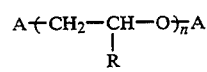

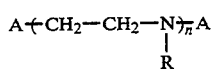

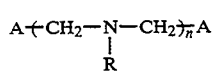

where n is about 3 to 50 and R is hydrogen or a $C_1$-$C_3$ alkyl group which is terminated by ethylenically unsaturated moieties or glycidyl moieties represented by A. A particularly useful group of compounds is obtained by reacting a polyethylene glycol with acrylic or methacrylic acid. Polyethylene glycol diacrylate is a particularly preferred polymer. To provide additional structural integrity, triacrylate prepolymers may be added.

Preferably, the radiation or thermally inert ionically conductive liquids have a boiling point greater than 80° C. Examples of these liquids include γ-butyrolactone, propylene carbonate, 1,3-dioxolane and 2-methyltetrahydrofuran. Less polar solvents having heteroatoms capable of bonding alkali metal cations are also useful. Polyethylene glycol dimethyl ether (PEGDME) is one such example. Glymes such as tetraglyme, hexaglyme, and heptaglyme are also desirable solvents. Propylene carbonate is a preferred solvent.

As to the ionizable salt, formula MX, this is not limiting at all, and is the type in which:

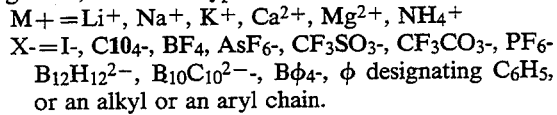

To produce a solid electrolyte material, the solution of the ionizable salt and inert ionically conductive liquid is mixed with the curable composition and the mixture is cured by exposure to actinic radiation, preferably electron beam or ultraviolet radiation or by heating if a thermally curable system is utilized. If ultraviolet radiation is used for curing, an ultraviolet photoinitiator may be added to the composition. Similarly if a thermally curable composition is selected, a thermal initiator should be present in the composition. Examples of thermally curable compositions are disclosed in U.S. Pat. No. 4,792,504, which is hereby incorporated by reference.

Alternatively, the electrolyte can take the form of a solid solution of an alkali or alkaline earth salt in a curable polymerizable compound. In still another embodiment, the solid solution may include a plasticizer or liquid electrolyte in addition to the solid solution.

The cathode composition layer 14 includes a cathode material which is coated on the microroughened 13 surface of the current collector 12.

Cathode compositions are known in the art. Typically they comprise an intercalation compound, an ionically conductive solid polymer electrolyte containing solution of an alkali metal salt or alkaline earth salt as defined above, and an electrically conductive filler. A typical formulation may contain about 25 to about 70 parts by weight of intercalation compound, about 2 to about 15 parts of an electrically conductive filler, and about 15 to about 75 parts of the ionically conductive electrolyte.

The following compounds have been taught in the art for use as intercalation compounds: $V_6O_{13}$, $MoO_2$, $MnO_2$, $V_2O_5$, $TiS_2$, $MoS_3$, $Cr_3O_6$, $Li_xV_3O_8$, $V_3O_8$, $VS_2$, $NbSe_2$, $FeOCl$, $CrOBr$, $TiNCl$, $ZrNCl$, $HfNBr$, $FeS$, $NiS$, $CoO$-and, $CuO$ and $WO_2$. $V_6O_{13}$ is particularly preferred. For use as an electrically conductive filler, carbon may be used.

In addition to providing a matrix for containing the alkali metal salt, the ionically conductive polymer additionally functions as a binder material to enable the cathode composition to adhere to the collector substrate. Because of its adhesive qualities, acrylated polyethylene oxide is the preferred ionically conductive polymer. For use as an additional adhesive, acrylated polyesters may be selected.

The process for producing cell 10 is as follows. Because the cell produced utilizes an alkali metal anode layer, usually a lithium anode layer, it is necessary to manufacture the cell in a water (humidity) free environment. Lithium is extremely reactive with water and if reacted, a passivation layer can form on the surface of the anode layer, reducing the efficiency of the layer, and increasing cell impedance. Accordingly, it is particularly desirable to manufacture the cell in an environment having a relative humidity at room temperature of less than 2% (less than 300 ppm water). An environment containing between 1 ppm and 50 ppm water produces a particularly efficient cell.

Cathode composition 14 as defined above is coated onto the microroughened surface of current collector 12. Cathode composition 14 is paste-like in consistency. Coating may be accomplished using conventional coating techniques such as doctor blade or coating an extrusion method. In practice, the optimum thickness ranges between about 25 and about 250 microns. In order to obtain a one-hour discharge with 75–100% utilization of the cathode composition, the layer thickness ranges between 50 and 100 microns in thickness. Where a faster discharge rate is desired, a lower thickness may be selected. Conversely, if a slower discharge rate is desired, a thicker layer may be provided. In practice, the cathode composition layer has an impedance less than 50 ohms/cm$^2$.

After cathode composition 14 has been coated onto current collector 12, the top surface of the cathode layer is optionally rolled by utilizing a non-stick pressure roller such as a PTFE roller. Alternatively, if the cathode composition sticks to the surface of the roller, a non-stick release liner, not pictured, may be placed onto the upper surface, the roller can traverse the length of the release liner, and the release liner can then be removed. Rolling upper surface of the cathode layer benefits in that it improves adherence between cathode composition 14 and current collector 12 and produces a smoother surface which enables a very thin electrolyte layer to be coated thereon. As a result of the surface rolling, the open circuit voltage discharge associated with cathode composition 14 is significantly reduced as compared to a cell whose cathode does not have a rolled surface. Accordingly, the overall cell efficiency is improved.

The utilization of microroughened surface 13 of the current collector 12 along with the optional pressure rolling step following the coating of cathode composition 14 onto current collector 12 enables a tightly adherent contact to occur between the respective materials. This, in turn, reduces impedance at the collector/cathode composition interface. The impedance at the interface is typically less than 10 ohms/cm$^2$ and, in the preferred embodiment, less than 5 ohms/cm$^2$.

Electrolyte layer 16 is coated as a thin film onto the cathode composition layer 14. The electrolyte can be extruded and coated in a very thin layer, typically ranging from about 5 microns to about 25 microns. The ability to coat in a thin layer is in large part due to the continuous surface of cathode composition. When electrolyte 16 is coated onto cathode 14, it is coated in an uncured liquid state. As is readily understood, electrolyte layer 16 must completely coat cathode composition layer 14 to prevent the intercalation compound and electrically conductive filler from protruding through electrolyte layer 16. The thickness of electrolyte layer 16 need only be thick enough to completely coat the upper surface of the cathode composition.

Once electrolyte layer 16 has been coated onto cathode composition 14, the assembly is partially or totally cured by radiation or thermal means. In practice, exposure of the assembly to an electron beam operating at a power of 3 to 9 Mrad is particularly preferred. Alternatively an ultraviolet or thermal source may be selected. If an ultraviolet source is selected, the monomer preferably includes an ultraviolet initiator of the type commonly known in the art such as thioxanthone initiators. If a thermal source is selected, the monomer preferably includes a thermal initiator of the type-commonly known in the art such as those disclosed in U.S. Pat. No. 4,792,504 to Schwab et al. Curing the cathode composition and the electrolyte polymerizes and crosslinks and thereby solidifies the monomeric material by conversion to a polymeric form.

A partial curing step (as opposed to full curing) may be particularly desirable as this enables the electrolyte layer 16 to remain somewhat tacky. This enables better adherence between the electrolyte and the anode layer, when coated.

After partial or total curing of cathode composition 14 and electrolyte 16, alkali metal anode layer 18 is applied to electrolyte layer 16. Although not pictured, a thin polymeric material such as a porous polypropylene sheet may be interposed between the anode and the electrolyte to ensure that the anode does not contact the cathode layer, particularly at the outer edges of the respective layers. Use of the polymeric sheet is optional.

After anode layer 18 is coated onto electrolyte 16, the entire assembly is optionally passed through pressure rollers. The pressure rolling step aids in the adhesion of the layers to each other, thereby reducing interfacial impedance between component layers.

If the cathode composition 16 and electrolyte 14 have not been completely cured, the entire assembly is again cured by exposure to actinic radiation, preferably electron beam radiation or by thermally curing. This step functions to solidify the cathode composition and electrolyte layers, thereby producing a solid state cell.

Once the current collector, cathode composition, electrolyte composition and anode composition have been assembled, electrodes are attached to the anode and current collector layers by means known in the art. The assembly is then inserted into an air and water impermeable protective material 20 and the edges of the protective material are sealed, preferably by heat sealing around edges of the cell components. Sealing preferably occurs under vacuum conditions to enable the protective material to form a tightly adherent seal around the component layers and electrodes such that the only external access to the component layers is via the electrodes.

Examples of the heat sealable gas and water impermeable protective materials include a multi-layered material having an interior heat sealable layer comprising ethylene acrylic acid, an intermediate barrier layer comprising aluminum foil, and an exterior layer of polyethylene terephthalate. Other heat sealable protective materials known in the art can be used in accordance with the present invention. The protective materials should be as thin as possible to minimize the overall thickness of the cell. Commercially available heat sealable materials of the types described above can have an overall thickness of less than 200 microns.

Once the components have been inserted and sealed in the protective material, the cell is available for use by simply connecting the electrodes to the device to be powered. When utilizing a single lithium anode cell, the cell generates a voltage of approximately 2.7 volts and a current flow exceeding 50 milliamps/cm$^2$. Referring now to FIG. 5 an alternative current collector is shown and designated as 100. Collector 100 includes polymeric substrate 102 having coated thereon a layer of an electrically conductive material 104. Optionally overcoated on material 104 is another layer of an electrically conductive material 106. Substrate 102 may be selected from polymeric film materials including polyethylene, polyethylene terephthalate and polyvinyl chloride. The thickness of film 102 is extremely thin, with thickness of less than 5 microns and even about 1 micron possible. This enables the manufacture of very thin current collectors, and hence, very thin laminar cells.

Electrically conductive materials 104 or 106 may be any of the materials as discussed with respect to FIG. 2. Examples of such materials may include copper, carbon, aluminum, nickel, steel, lead and iron and combinations thereof.

Alternatively, examples of other electrically conductive materials may include electrically conductive inks. Such inks are known in the art and are typically used for screen printing, manufacture of membrane switches, EL lamps and displays, and flexible circuits. Examples of silver filled and indium oxide-filled electrically conductive inks are manufactured by Zymet Inc. of East Hanover, N.J. The inks are applied onto the polymeric film in a patterned form such as a grid, mesh, spiral, and the like. Depending on the thickness of the ink layer, an extremely thin current collector can be produced.

Referring to FIG. 6, an electron microscope side view photograph of a current collector manufactured in accordance with the present invention is shown. Collector 100A includes polyethylene terephthalate film 102A overcoated with a vapor deposited first layer of copper 104A which is overcoated with an electrodeposited layer of nickel particles 106A. The overall thickness of this collector is about 1 to 5 microns.

The invention is further explained in the following non limiting examples.

Comparative Example 1

A cell was produced by first forming a cathode mixture including 45% by weight $V_6O_{13}$, 4% carbon and 51% of an electrolyte including 70% propylene carbonate, 3% polyethylene oxide, 6% $LiCF_3SO_3$ and 21% of a radiation curable acrylate. This mixture was coated onto a 15 micron thick solid nickel foil current collector to a thickness of about 75 microns having a surface area of about 32 cm$^2$. The above defined electrolyte was then coated onto the cathode to a thickness of about 50 microns. A 100 micron thick lithium foil was then laminated onto the electrolyte and the entire structure was subjected to electron beam radiation to cure the cathode and electrolyte. The initial cell impedance at 1 Hz was measured to be about 110 ohms.

Example 2

A cell having the identical cathode, electrolyte and anode of Comparative Example 1 was produced by using a 35 micron thick nickel foil current collector having a surface area of about 32 cm$^2$ which was etched to provide a roughened surface. The measured impedance at 1 Hz was 12 ohms.

Comparative Example 3

A cell was prepared identical to the cell of Comparative Example 1 with the exception that the cathode contained 53% $V_6O_{13}$, 8% carbon and 39% electrolyte. The measured cell impedance at 1 Hz was 150 ohms.

Example 4

A cell having the identical cathode, electrolyte and anode of Comparative Example 3 was produced using the current collector of Example 2. The measured impedance at 1 Hz was 5 ohms.

Example 5

The cell of Comparative Example 3 was discharged at 200 microamperes/cm$^2$ at room temperature to lower the voltage from 3 V to 1.5 V. The discharge time was 15 hours.

Example 6

The experiment of Example 5 was repeated using the cell of Example 4. The discharge time was 17.5 hours.

Example 7

In an inert, nitrogen environment, a cathode composition is prepared by grinding 300 parts of $V_6O_{13}$ for 24 to 48 hours in the presence of an equal amount of tetrahydrofuran in a one liter ball mill using 1.25 cm diameter ceramic balls. After grinding, the average particle size of $V_6O_{13}$ is about 1.5 microns. The slurry is transferred to an airtight mixer and 46.2 parts of predried carbon are added to the mixer to produce a slurry having a weight ratio of $V_6O_{13}$ to C of about 6.5 to 1. The mixture is stirred at low speed (20 rpm) under vacuum and heat, until the tetrahydrofuran is evaporated. The overall water content of the mixture is less than 100 ppm. 3 parts of polyethylene oxide (PEO) having a molecular weight greater than 100,000 is added to the $V_6O_{13}$/C powder mixture. The mixture is stirred for about 10 to 20 minutes to adequately disperse the polyethylene oxide. Propylene carbonate (PC), polyethylene glycol diacrylate (PEGDA), and trimethylolpropane ethoxylated triacrylate (TMPEOTA) are added to the mixture to produce a mixture having the following components:

| component | percent (weight) |
| --- | --- |
| $V_6O_{13}$ | 45 |
| C | 7 |
| PC | 37 |
| PEO | 1 |
| PEGDA | 8.5 |
| TMPEOTA | 1.5 |

The mixture temperature is increased to 65° C. and the mixture is stirred at low speed for 20 minutes. The speed of the mixer is increased to 75 rpm and the mixture is stirred for 2 to 3 additional hours.

The mixture is then coated onto a 5 cm×20 cm×25 micron high surface treated nickel foil available from Fukuda Metal Foil & Powder Co. Ltd. of Kyoto, Japan by utilizing a doctor blade technique at 50°–60° C. in a completely inert (nitrogen) environment containing less than 25 ppm water. The thickness of the cathode layer is 75 microns and the cathode layer is then covered with a stainless steel foil. A 2 inch diameter, 10 inch long stainless steel roller is placed on top of the foil and the roller is rolled along the length of the foil at a pressure of 5–10 kg/cm² to improve adherence of the cathode layer to the current collector. The assembly is then irradiated with a 3 Mrad dose of radiation by utilizing an electron beam source to cure the cathode layer. The foil is then peeled off of the cathode layer. The impedance of the cathode is less than 50 ohm/cm².

An electrolyte is prepared by mixing together the following components in the following weight fractions:

| component | percent (weight) |
|---|---|
| PC | 68 |
| LiAsF$_6$ | 18 |
| PEO | 2.5 |
| PEGDA | 9.2 |
| TMPEOTA | 2.3 | component percent (weight)
The overall water concentration of the electrolyte is less than 50 ppm. The electrolyte is coated onto the cathode layer by using a doctor blade at room temperature to a thickness of about 25 microns. The electrolyte is then irradiated with a 3 Mrad dose of radiation from an electron beam source. The impedance of the electrolyte layer is about 0.8 ohm/cm².

A 4 cm×12.5 cm×125 micron thick lithium strip (lithium metal/battery grade) available from Lithco of Bessemer City, N.C. is applied to one end of the electrolyte layer and the lithium strip is adhered to the layer by applying pressure from a 2 inch diameter, 10 inch long roller at 5–10 kg/cm² across the entire lithium surface. The opposite end of the electrolyte/cathode/current collector assembly is folded over the anode layer to form a bifaced cell. Copper tabs were spot welded to the current collector and pressure rolled onto the lithium foil to form electrodes for connection to a device. The physical and mechanical properties of the produced battery were as follows:

| property | value |
|---|---|
| surface area | 100 cm² |
| volume | 2 cm³ |
| capacity | 250 mAh |
| average voltage | 2.4 V |
| discharge time (50 mA drain) | 5 hours |
| discharge time (250 mA drain) | 0.5 hours |
| discharge time (10 A pulses) | 1.5 minutes |
| energy density | 300 wh/l |
| overall impedance | 150 ohm/cm² |

Having described the invention in detail and by reference to preferred embodiments thereof, it will be apparent that modifications and variations are possible without departing from the scope of the invention defined in the appended claims.

What is claimed is:

1. A solid state laminar electrochemical cell comprising:
   an alkali metal anode layer;
   a solid ionically conductive electrolyte layer including an ionizable alkali metal salt or alkaline earth metal salt, an inert solvent for the salt, and a polymerizable material;
   a cured cathode composition layer which is cured using radiation or thermal initiated polymerization wherein said cathode composition layer includes an ionically conductive electrolyte comprising an ionizable alkali metal salt or alkaline earth salt and an inert liquid solvent for said salt; and
   a current collector including a metal foil substrate;
   with the electrolyte layer interposed between said alkali metal anode layer and said cured cathode layer, and said cathode layer interposed between said electrolyte layer and said current collector, the surface of said current collector which contacts said cathode layer being micro-toughened for providing low impedance between the collector and the cathode layer by enabling the cathode layer to tightly adhere to said current collector, and wherein the current collector and cured Cathode composition layer forms a collector/cathode composition interface and wherein the impedance at the collector/cathode composition interface is less than 10 ohms/cm².

2. The cell according to claim 1 wherein the impedance at the collector/cathode composition interface is less than 5 ohms/cm².

3. A solid state laminar electrochemical cell comprising:
   an alkali metal anode layer;
   a solid ionically conductive electrolyte layer including an ionizable alkali metal salt or alkaline earth metal salt, an inert solvent for the salt, and a polymerizable material;
   a cured cathode composition layer which is cured using radiation or thermal initiated polymerization wherein said cathode composition layer includes an ionically conductive electrolyte comprising an ionizable alkali metal salt or alkaline earth salt and an inert liquid solvent for said salt; and
   a current collector including a metal foil substrate;
   with the electrolyte layer interposed between said alkali metal anode layer and said cured cathode layer, and said cathode layer interposed between said electrolyte layer and said current collector, the surface of said current collector which contacts said cathode layer being micro-roughened for providing low impedance between-the current collector and the Cathode layer by enabling the cathode layer to tightly adhere to said current collector wherein said micro-toughened surface is produced by electrondepositing metal particles on said foil and wherein said metal foil substrate and said electrondeposited metal comprise nickel and wherein the current collector and cured cathode composition layer forms a collector/cathode composition interface and wherein the impedance at the collector/cathode composition interface is less than 10 ohms/cm².

4. The cell according to claim 3 wherein the impedance at the collector/cathode composition interface is less than 5 ohms/cm².

5. A solid state laminar electrochemical cell comprising:
   an alkali metal anode layer;
   a solid ionically conductive electrolyte layer including an ionizable alkali metal salt or alkaline earth metal salt, an inert solvent for the salt, and a polymerizable material;
   a cured cathode composition layer which is cured using radiation or thermal initiated polymerization wherein said cathode composition layer includes an ionically conductive electrolyte comprising an ionizable alkali metal salt or alkaline earth salt and an inert liquid solvent for said salt; and a current collector including a metal foil substrate;

with the electrolyte layer interposed between said alkali metal anode layer and said cured cathode layer, and said cathode layer interposed between said electrolyte layer and said current collector, the surface of said current collector which contacts said cathode layer being micro-toughened for providing low impedance between the current collector and the cathode layer by enabling the cathode layer to tightly adhere to said current collector, wherein said salt is a salt of a cation selected from the group consisting of $Li^+$, $Na^+$, $K^+$, $Mg^{2+}$, $Ca^{2+}$ and $NH_4^+$ and an anion selected from the group consisting of $I^-$, $ClO_4^-$, $BF_4^-$, $AsF_6^-$, $PF_6^-$, $CF_3SO_3^-$, $CF_3CO_3^-$, $B_{12}H_{12}^{2-}$, $B_{10}Cl_{10}^{2-}$, and $B\phi_4^-$, where $\phi$ is $C_6H_5$, an alkyl chain or an aryl chain, wherein said salt cation and said salt anion are maintained in stoichiometric amounts, and wherein the current collector and cured cathode composition layer forms a collector/cathode composition interface and wherein the impedance at the collector/cathode composition interface is less than 10 ohms/cm$^2$.

6. The cell according to claim 5 wherein the impedance at the collector/cathode composition interface is less than 5 ohms/cm$^2$.

7. A solid state laminar electrochemical cell comprising:

an alkali metal anode layer;

a solid ionically conductive electrolyte layer including an ionizable alkali metal salt or alkaline earth metal salt, an inert solvent for the salt, and a polymerizable material;

a cured cathode composition layer which is cured using radiation or thermal initiated polymerization wherein said cathode composition layer includes an ionically conductive electrolyte comprising an ionizable alkali metal salt or alkaline earth salt and an inert liquid solvent for said salt; and a current collector including a metal foil substrate;

with the electrolyte layer interposed between said alkali metal anode layer and said cured cathode layer and said cathode layer interposed between said electrolyte layer and said current collector, the surface of said current collector which contacts said cathode layer being micro-roughened for providing low impedance between the current collector and the cathode layer by enabling the cathode layer to tightly adhere to said current collector wherein said anode layer comprises lithium foil, a metal foil coated with a layer of lithium or a lithium alloy, wherein said cathode composition comprises an intercalation compound, an electrically conductive filler and an ionically conductive electrolyte, and wherein the current collector and cured cathode composition layer forms a collector/cathode composition interface and wherein the impedance at the collector/cathode composition interface is less than 10 ohms/cm$^2$.

8. The cell according to claim 7 wherein the impedance at the collector/cathode composition interface is less than 5 ohms/cm$^2$.

* * * * *